United States Patent
Sarma et al.

[11] Patent Number: 5,885,322
[45] Date of Patent: Mar. 23, 1999

[54] METHOD FOR REDUCING IRON LOSSES IN AN IRON SMELTING PROCESS

[75] Inventors: Balu Sarma, Airmont, N.Y.; Kenneth B. Downing, Greenville, S.C.

[73] Assignee: Steel Technology Corporation, Washington, D.C.

[21] Appl. No.: 823,012

[22] Filed: Mar. 21, 1997

Related U.S. Application Data

[60] Provisional application No. 60/013,888 Mar. 22, 1996.

[51] Int. Cl.$^6$ ...................................................... C21B 11/00
[52] U.S. Cl. ................................ 75/381; 75/382; 75/386; 75/502
[58] Field of Search ............................ 75/381, 382, 386, 75/502

[56] References Cited

U.S. PATENT DOCUMENTS

| | | | |
|---|---|---|---|
| 3,346,190 | 10/1967 | Shepherd | 239/132.3 |
| 3,871,871 | 3/1975 | Denis et al. | 75/60 |
| 4,043,800 | 8/1977 | Mahn et al. | 75/60 |
| 4,135,915 | 1/1979 | Kennard | 75/60 |
| 4,325,730 | 4/1982 | Schleimer et al. | 75/52 |
| 4,334,922 | 6/1982 | Metz et al. | 75/60 |
| 4,651,976 | 3/1987 | Arima et al. | 266/44 |
| 4,891,064 | 1/1990 | Umezawa et al. | 75/51 |
| 4,944,799 | 7/1990 | Tanabe et al. | 75/501 |
| 4,961,784 | 10/1990 | Tanabe et al. | 75/623 |
| 4,995,906 | 2/1991 | Iwasaki et al. | 75/502 |
| 5,065,985 | 11/1991 | Takahashi et al. | 266/156 |
| 5,078,785 | 1/1992 | Ibaraki et al. | 75/386 |

FOREIGN PATENT DOCUMENTS

| | | |
|---|---|---|
| 0007856 | 2/1980 | European Pat. Off. . |
| 686703A1 | 12/1995 | European Pat. Off. . |
| 690136A1 | 1/1996 | European Pat. Off. . |
| 726326A2 | 8/1996 | European Pat. Off. . |
| 735146A1 | 10/1996 | European Pat. Off. . |
| 59-153848 | 9/1984 | Japan . |
| 789619 | 12/1980 | U.S.S.R. . |

OTHER PUBLICATIONS

"Recent Practical Achievements on the AISI Direct Smelting of Steel Plant Waste Oxide". William Dennis, American Iron and Steel Institute, Gorham Conference in Atlanta, Mar. 22, 1995.

Investigation on the Effect of Zn on the Behavior of S in the Iron Bath Smelting Reduction Process. Hong–jia Li and Masanni Tokuda, Steel Research 64 (1993) No. 1, p. 39.

*Primary Examiner*—Melvyn Andrews
*Attorney, Agent, or Firm*—Fitzpatrick, Cella, Harper & Scinto

[57] ABSTRACT

A process of smelting iron that comprises the steps of:
  a) introducing a source of iron oxide, oxygen, nitrogen, and a source of carbonaceous fuel to a smelting reactor, at least some of said oxygen being continuously introduced through an overhead lance;
  b) maintaining conditions in said reactor to cause (i) at least some of the iron oxide to be chemically reduced, (ii) a bath of molten iron to be created and stirred in the bottom of the reactor, surmounted by a layer of slag, and (iii) carbon monoxide gas to rise through the slag;
  c) causing at least some of said carbon monoxide to react in the reactor with the incoming oxygen, thereby generating heat for reactions taking place in the reactor; and
  d) releasing from the reactor an offgas effluent,
is run in a way that keeps iron losses in the offgas relatively low. After start-up of the process is complete, steps (*a*) and (*b*) are controlled so as to:
  e) keep the temperature of the molten iron at or below about 1550° C. and
  f) keep the slag weight at or above about 0.8 tonne per square meter.

27 Claims, 7 Drawing Sheets

FIG. 5A LANCE POSITION (CM ABOVE VESSEL FLOOR)

FIG. 5B POSTCOMBUSTION (%)

FIG. 5C SLAG WEIGHT / CROSS-SECTIONED AREA  t/m$^2$

FIG. 6A LANCE POSITION (CM ABOVE VESSEL FLOOR)

FIG. 6B POSTCOMBUSTION (%)

FIG. 6C HOT METAL TEMPERATURE (C)

METHOD FOR REDUCING IRON LOSSES IN AN IRON SMELTING PROCESS

The Government of the United States of America has rights in this invention pursuant to Cooperative Agreement No. DE-FC07-94ID13284 awarded by the U.S. Department of Energy.

BACKGROUND OF THE INVENTION

This application claims the benefit of the filing date of Provisional Application No. 60/013,888, filed Mar. 22, 1996. The present invention relates generally to improvements in iron smelting processes. More particularly, the invention concerns a method of reducing iron losses in an iron smelting process utilizing post-combustion steel smelting technology. The method has particular utility in smelting processes using iron ores and iron bearing oxides such as steel plant dusts and sludge, but may also be incorporated into other processes with iron bearing feedstocks.

Methods of steel production using a source of iron oxide and coal-based fuels are well known in the art. During such smelting processes, a substantial amount of dust is produced by the smelting furnace. Traditionally, the dust emitted from furnaces have been feed to sinter plants. Over the years, however, many sinter plants in the United States have been shut down for a variety of reasons. Moreover, so far as Applicants are aware, the remaining sinter plants currently in operation are limited, in most cases, to using only steel plant residuals. Steel plant dust and sludges that contain zinc are generally poor iron oxide sources for sinter plants because the zinc tends to recirculate in the furnace and form destructive accreations. In addition, steel plant residuals often contain oils (rolling mill sludge) or alkalis (blast furnace sludge) that cannot be charged to sinter plants because of environmental concerns.

Several steel plants have attempted to remedy the previously mentioned deficiencies by agglomerating steel plant residuals and recycling the same back to the blast furnace. However, this approach adversely affects the performance of the blast furnace by lowering productivity and product quality, while simultaneously increasing operating costs. Moreover, the steel plant residues often have unacceptably high levels of iron relative to zinc that prohibit recycling the sludge back to the smelter. Consequently, in most steel plants in North America, waste oxides present in plant residuals are landfilled at substantial costs to the steelmaker. However, landfilling waste oxides is not considered a long term solution for environmental reasons. Consequently, it is preferable to reduce the total volume of waste oxides that are landfilled. Accordingly, it is an object of the invention to produce an economical method of smelting that minimizes the environmental impact. To these ends, Applicants have developed a method to reduce iron loses resulting from such smelting processes.

SUMMARY OF THE INVENTION

In the process that is improved by the present invention, a source of iron oxide, oxygen, nitrogen, and a source of carbonaceous fuel is introduced to a smelting reactor. At least some of the oxygen is continuously introduced through an overhead lance. For ease of reference, we will refer herein to this charging of materials (gaseous as well as solid) as "step (a)."

As step (b), conditions are maintained in the reactor to cause (i) at least some of the iron oxide to be chemically reduced, (ii) a bath of molten iron to be created and stirred in the bottom of the reactor, surmounted by a layer of slag, and (iii) carbon monoxide gas to rise through the slag.

At least some of the carbon monoxide is caused to react in the reactor with the incoming oxygen, thereby generating heat for endothermic reactions taking place in the reactor, in particular the reduction of the iron oxide by the carbon, to yield elemental iron.

An offgas effluent is released from the reactor. It will typically contain some unreacted carbon monoxide, mixed with carbon dioxide, hydrogen, and $H_2O$, as well as entrained dust. The hydrogen normally comes from the carbonaceous fuel, which usually has some amount of hydrocarbon components that break down in the heat of the reactor to generate hydrogen. The dust in the offgas will typically contain some amount of iron oxide and carbon, as well as other solids, e.g., particles of metallic iron.

In the present improvement of the above-described smelting process, the level of ferrous content in the offgas is kept relatively low by performing a combination of at least two steps: keeping the temperature of the molten iron at or below about 1550° C. and keeping the slag weight at or above about 0.8 tonne per square meter, preferably in the range of about 0.8 to 2 tonnes per square meter. These controls are maintained after start-up of the process is complete. Most preferably, the molten iron will be kept at a temperature at or below about 1535° C. Maintenance of the molten iron temperature and the slag weight within these limits can be achieved by control of the variables in steps (a) and (b) of the process, most especially the rate of introduction of the various materials to the reactor. While the weight of slag in the reactor cannot be measured directly, it can be calculated for any moment in time using materials balances.

Methods of measuring the temperature of the molten iron are known in the art. For example, a thermocouple or an optical pyrometer can be used.

Preferably, the majority of the carbonaceous fuel (dry weight basis) that is charged to the reactor will be either coal or coke breeze. Coke breeze, sometimes referred to as "coke braize," is the fine particles of coke that are formed by abrasion and fragmentation of larger coke particles during handling and transportation.

As mentioned, at least some of the carbon monoxide that rises through the slag reacts with the incoming oxygen to release heat and produce carbon dioxide. Any hydrogen that is yielded by the carbonaceous fuel will also react, at least partially, with the incoming oxygen. These reactions are generally referred to as post-combustion in the smelter, the primary combustion being the oxidation of the carbon. When smelting iron in a process employing post-combustion, the degree of post-combustion ("PCD") can be calculated according to the equation $$PCD = 100 \times \frac{(\%CO_2 + \%H_2O)}{(\%CO + \%CO_2 + \%H_2 + \%H_2O)},$$

wherein the percentages are volume percentages. In the present process it is preferred that the aforementioned steps (a) and (b) be controlled so as to keep the post-combustion degree within the range of about 30 to 60%. If the majority (dry weight basis) of the carbonaceous fuel is coal, the PCD will preferably be kept within the range of about 30 to 50% (e.g., about 30 to 40%). If the majority of the fuel is coke breeze, the PCD preferably will be kept within the range of about 45 to 60% (e.g., about 50 to 60%).

One of the variables in the iron smelting process of the present invention is the position of the overhead oxygen lance, in relation to the upper level of the slag layer. We have found it to be generally true that the greater the distance between the lowermost oxygen outlet of the lance and the upper level of the slag layer, the greater will be the degree of post-combustion. Preferably, the design of the reactor and lance is such that the position of the lance can be vertically adjusted during the process, so as to lengthen or shorten the distance between the lance and the upper level of the slag layer. After start-up of the process is complete, it is preferred that the post-combustion degree occurring in the reactor be repeatedly determined and, in response to at least one of those determinations, the position of the overhead oxygen lance, in relation to the upper level of the slag layer, be vertically adjusted to help keep the post-combustion degree within the preferred range. (By "repeatedly" we here mean that the PCD is either continuously determined or is determined at regular or irregular time intervals.) Most preferably, however, during substantially the entire time that materials are being charged to the reactor (after start-up is complete), the distance between the lowermost oxygen outlet of the lance and the upper level of the slag layer will be held within the range of approximately 40 to 80 centimeters.

Often (if not always) in this type of iron smelting operation, the downcoming oxygen from the lance will be emitted with such force that it creates a depression in the slag layer in the region below the lance tip. When we refer herein to the "upper level of the slag layer," we mean the topmost level, not the bottom of the concavity beneath the lance tip.

To determine the distance between the lance tip and the upper level of the slag layer, the location of the upper level of the slag layer at that time needs to be determined. This can be done by use of a conductivity probe or an acoustic device.

Equipment and procedures for measuring the content of $CO$, $CO_2$, $H_2$, and $H_2O$ in the of fgas are known in the art. For example, a mass spectrometer or gas chromatography equipment can be used. If the offgas's content of each of these four chemicals is not continuously measured, then it is preferred that they be measured (and the PCD be calculated from those measurements) at least once every 15 minutes.

It is also preferred in the present process that, after start-up is complete, steps (a) and (b) are controlled so as to keep the FeO content of the slag within the range of about 2 to 5 wt. %.

By use of the above-mentioned measures, the iron smelting process can be controlled to the point that the total ferrous content of the offgas (calculated as elemental iron) is kept at or below about 5% (preferably at or below about 2%), based on the weight of the total ferrous content of the materials introduced to the reactor (also calculated as elemental iron). This relatively low volume of waste oxide emission can be achieved while still having an economical process.

DETAILED DESCRIPTION OF THE PREFERRED EMBODIMENTS

Figure 1:
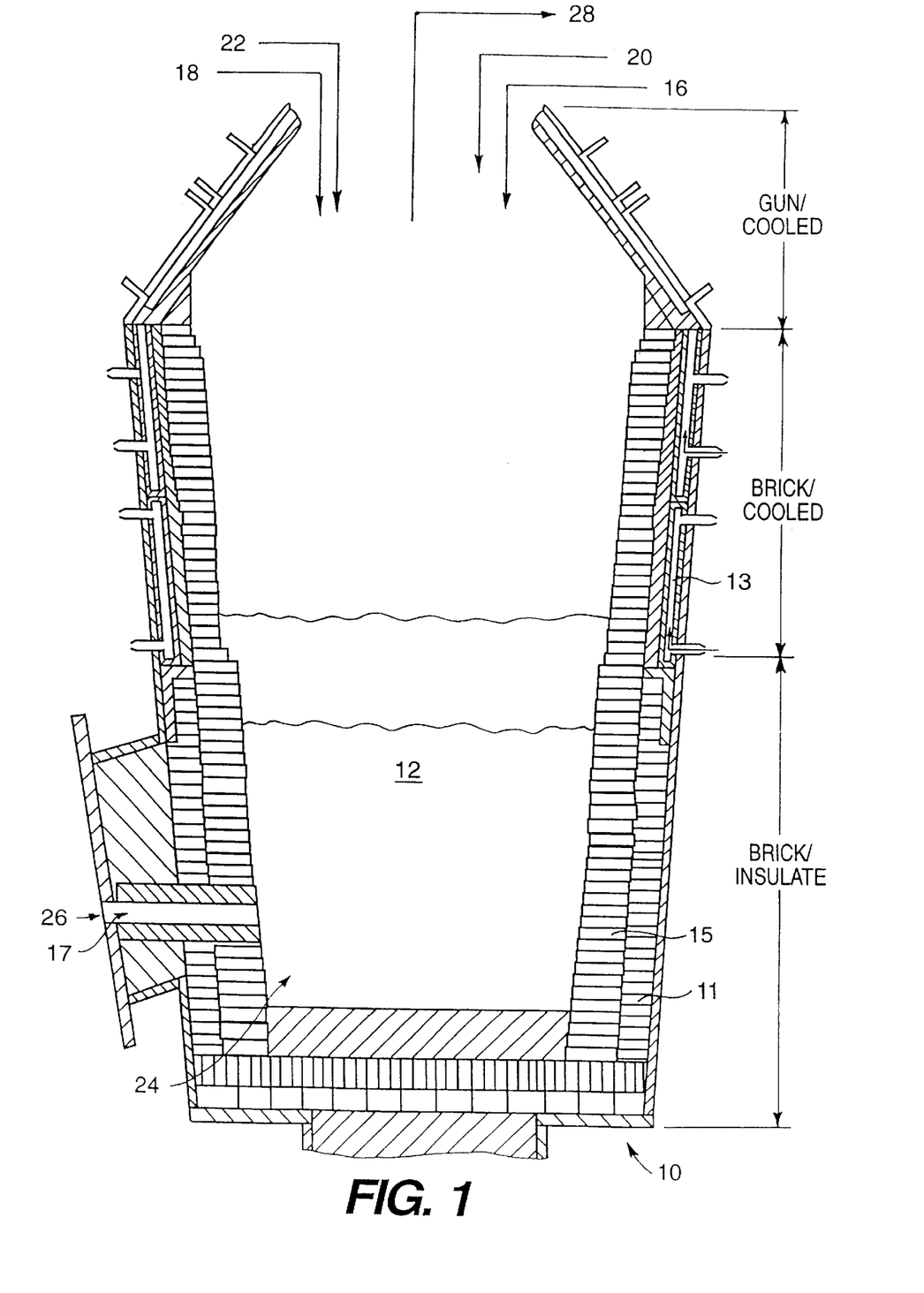
FIG. 1 is a schematic drawing of a smelter reactor showing gun-cooled, brick-cooled, and brick-insulated sections.

FIG. 1 illustrates a smelter reactor 10 with brick-cooled section A and a brick-insulated section B in which the process of the invention is to occur. The smelter reactor 10 can be any of a number of types of reaction vessels commonly known to those skilled in the art and used for the smelting of metals and their ores. In the preferred embodiment depicted in FIG. 1, a source of iron oxide 16, such as iron ore, is being reduced to iron and the resulting iron is being refined.

As shown schematically in FIG. 1, a bath of molten iron 12 in the smelter reactor 10 is being refined and iron ore is being reduced. A slag layer 14 rests on top of the bath of molten iron 12. Preferably, during operation, a mixture of iron oxide 16 and a source of zinc are charged to the smelter reactor 10. Preferably, the source of zinc comes from waste oxides 18, as described in copending patent application by Sarma et al. entitled, "Method for Reducing Sulfuric Content in the Offgas of an Iron Smelting Process," which is filed contemporaneously herewith and is hereby incorporated by reference.

Numerous mixtures of iron oxide 16 and waste oxides 18 can be charged to the reactor 10. The source of waste oxides 18 can be any of a number of materials, including, but not limited to, blast furnace dust, blast furnace sludge, electric arc furnace dust, electric arc furnace sludge, basic oxygen furnace dust, basic oxygen furnace sludge, zinc calcine, and zinc sinter. Iron oxide 16 in pellet form may be mixed with agglomerated briquettes of waste oxides 18, prior to being charged to the reactor. The agglomerated briquettes of waste oxides 18 are preferably formed by combining blast furnace (BF) dust/sludge, basic oxygen furnace (BOF) dust/sludge, or RM sludge with a binder comprising molasses and cement. The blast furnace dust/sludge, basic oxygen furnace dust/sludge, and rolling mill (RM) sludge can be obtained from the operation of integrated steel producers. Typically, the waste oxides 18 produced by integrated steel producers generally have a Zn content of up to 3.5% Zn on a dry weight basis. While waste oxides 18 can be charged in the form of agglomerated briquettes, the blast furnace dust or basic oxygen furnace dust can also be pneumatically injected into the slag 14. Preferably, the waste oxides 18 are directly injected into the reactor 10 in this manner.

The smelter reactor 10 is also charged with a carbonaceous fuel 20. Preferably, the carbonaceous fuel 20 consists of either coal or coke breeze. In addition, oxygen 22 is blown into the smelter reactor 10. Preferably, both the carbonaceous fuel 20 and oxygen 22 are top blown via a central, water-cooled, dual circuit lance (not shown) into the slag 14 contained within the smelter reactor 10. U.S. Pat. No. 5,374,297, incorporated herein by reference, discloses a structure of an overhead lance for injecting both oxygen 22 and a carbonaceous fuel 20.

During the smelting process, the iron oxides 16 dissolve in the slag 14 and are reduced by carbon to produce molten iron 12. The gangue oxides present in the charge report to the slag 14. The carbon within the carbonaceous fuel 20 charged to the smelter reactor 10 acts as both a fuel and a reductant. In addition, any carbon present within the waste oxides 18 charged to the smelter reactor 10 also serves as a fuel/reductant. This advantageously results in a reduction of the fuel requirement. Still referring to FIG. 1, nitrogen 24 is preferably injected through tuyeres (not shown) at the bottom of the smelter reactor 10 in order to stir the bath of molten iron 12. The molten iron 12 and the layer of slag 14 that are produced in the smelter reactor 10 are tapped, whereby some of the respective layers are removed from the smelter 10.

Preferably, the reactor 10 is tapped at regular intervals through a single taphole 26, using a mudgun and drill system. The removed molten iron 12 is a carbon saturated hot metal 17 that can be further pigged/granulated. In addition, the molten iron 12 can be used in an electric arc furnace or basic oxygen furnace for further processing. The slag 14 obtained from the smelter reactor 10 can be used in a variety of applications, as, for example, in the construction industry.

The energy requirements of the smelting process are provided by a primary combustion reaction and a post-combustion reaction. The primary combustion reaction consists of the partial oxidation of the carbon in the melt or carbon in the coal to form carbon monoxide. The CO rises from the melt and is further oxidized by $H_2$ present in the carbonaceous fuel, to form $CO_2$ and $H_2O$ in the post-combustion reaction. This post-combustion reaction provides additional heat of combustion.

During operation of the smelter reactor 10, a dust-laden offgas effluent 28 is produced that contains a plurality of constituents. This offgas 28 is released from the reactor 10 during operation. One component of the dust-laden offgas 28 is a carbonaceous content. The carbonaceous content primarily consists of carbon dust particles. During coal de-volitization, fragmentation of coal particles occurs, and some of those smaller particles are carried out of the smelter reactor 10 via the offgas effluent 28. The entrainment of fines also assists in the formation of carbonaceous material present in the offgas 28. In addition, carbon from unburned volatiles may be carried out of the reactor 10 in the form of soot.

The size of the carbon dust particles created depends on the type of carbonaceous fuel 20 being used. For instance, when coke breeze is used, approximately half of the dust might be in the 6 to 500 mesh range, with the remaining half being principally less than 500 mesh. When medium volatile coal is used, approximately 90% of the dust might be in the 6 to 500 mesh range, with the remainder being principally less than 500 mesh.

The dust-laden offgas 28 will typically have a ferrous content as well. Based on microscopic and chemical analysis of the dust-laden offgas 28, the ferrous content usually is comprised of both free metallic iron spheres and iron contained within coarser carbon particles. In addition, micron-sized metallic iron particles which have an outer iron oxide layer are also usually produced. Generally, the iron particles have a size of less than 500 mesh.

The dust-laden offgas 28 can also include a sulfuric content resulting from the smelting operation. Still referring to FIG. 1, sulfur is typically introduced to the smelter reactor via the carbonaceous fuel source 20 and/or the iron oxide source 16. In addition, sulfur is usually contained within the waste oxides 18 charged to the reactor 10. During operation, the sulfur is distributed among the hot metal 12, slag 14, and offgas 28. Within the offgas 28, sulfur is present primarily in the form of gaseous $H_2S$, COS, $SO_2$, and $CS_2$.

Figure 2:
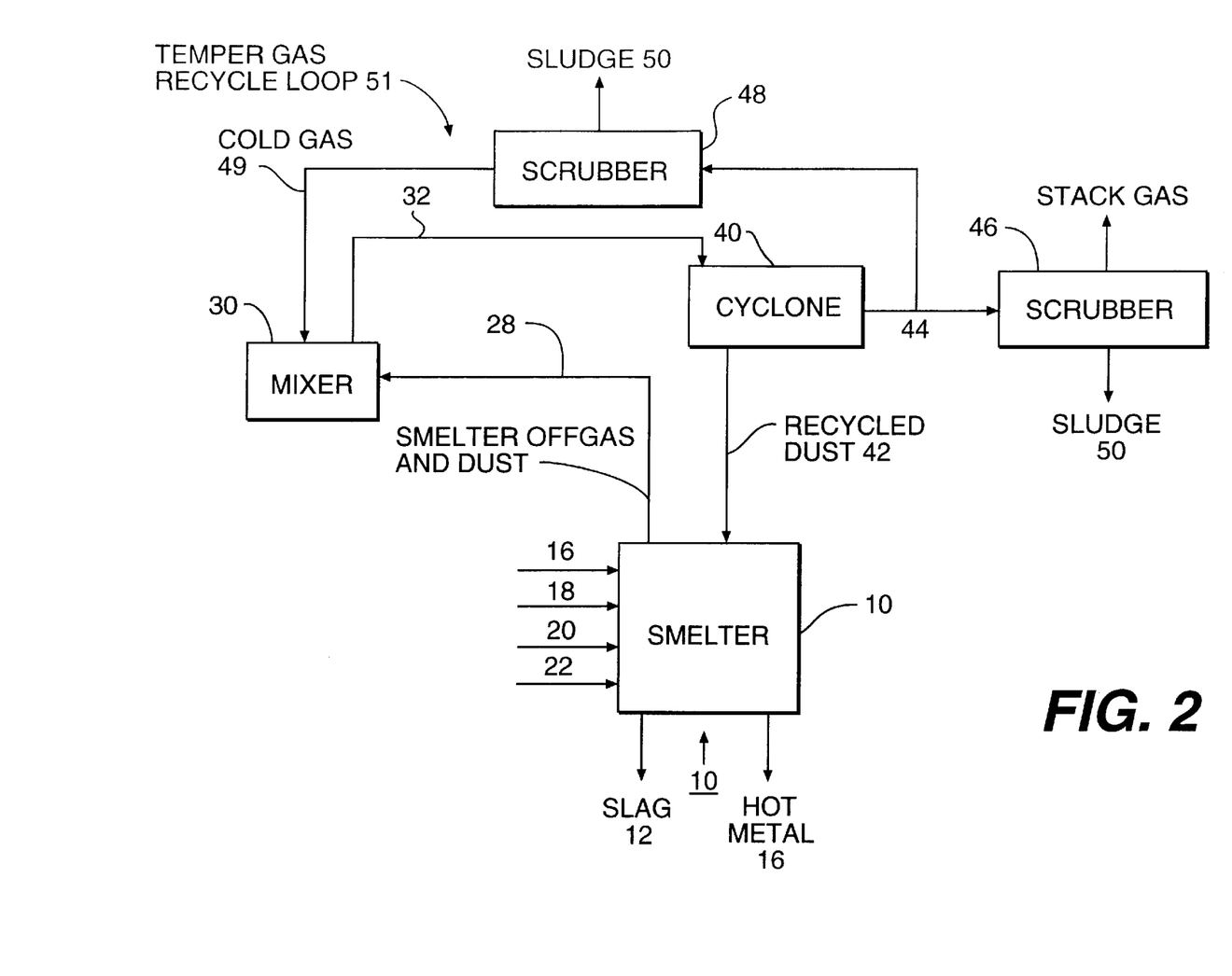
FIG. 2 is a flowsheet of a pilot plant used to reduce the iron losses to the offgas from a smelter reactor according to one embodiment of the invention.

FIG. 2 illustrates one preferable flowsheet for a plant to reduce the iron content in offgas 28. Referring now to FIGS. 1 and 2, the dust-laden offgas 28 exits the smelter reactor 10 at a temperature well above 1000° C. The offgas 28 exiting the smelter reactor 10 is preferably mixed with a cold gas stream 49 from temper gas recycle loop 51 within mixer 30. The temper gas recycle loop 51 aids in adjusting the flowrate and temperature of offgas 28. The combined offgas streams 32 then pass to a cyclone 40. It should be noted that, the presence of cyclone 40 and recycle loop 51 are optional, i.e., the ferrous content of offgas 28 can be reduced without the presence of cyclone 40 and recycle loop 51. Nonetheless, it is preferable to incorporate cyclone 40 and recycle loop 51 to reduce the total amount of ferrous and carbonaceous content produced from smelter reactor 10. Preferably, the offgas stream 32 entering cyclone 40 has a temperature exceeding 700° C. Within cyclone 40, the carbonaceous and ferrous content comprising a significant portion of the dust in offgas 28 are then separated. Preferably, as seen in FIG. 2, a cyclone 40 capable of operation at temperatures exceeding 1000° C. separates both the carbonaceous and ferrous content from the offgas 28.

Referring to FIGS. 1 and 2, a description of the Zn path will now be described. While the reactor 10 is charged with both the iron oxide 16 and waste oxide feed 18, the zinc compounds present in both feeds are reduced and volatilized, producing gaseous Zn. The gaseous Zn then exits the smelter reactor 10 in the offgas 28. The Zn next passes through the cyclone 40 with minimal loss of Zn to the cyclone catch 42, when the cyclone temperature is maintained above approximately 900° C.

Still referring to FIG. 2, the offgas 28 exits cyclone 40, and is split into two separate streams that are fed to a pair of scrubbers 46 and 48. Any dust that bypasses the cyclone 40 is collected at either one of the two scrubber systems 46, and 48. In addition, the wet scrubbers 46 and 48 advantageously wash the offgas 44 exiting cyclone 40 with water to extract gaseous components of offgas 44. The wet scrubbers 46 and 48 precipitate a sludge 50 containing ZnO, and ZnS.

Numerous smelting operations were conducted in the pilot plant illustrated in FIG. 2, to determine the effects of various operating parameters. Both coal and coke breeze were used as a source of carbonaceous fuel source 20. In addition, various sources of waste oxides 18 were blended with a source of iron oxide 16, in vary degrees prior to charging the reactor 10. The experimental results of the trials will now be described.

The smelter reactor 10 shown in FIG. 1 is illustrative of the type of smelter reactor 10 used in the pilot plant experiments and includes a brick-cooled section A and a brick-insulated section B. The smelter reactor 10 contains a water-cooled cone and hood (not shown), at the top of the reactor 10, and is coated with gunnite material. The reactor 10 is lined with refractory 11 up to the cone. The refractory 11 in the metal-free space (upper barrel) is backed by water-cooled copper staves 13. Additional staves 13 may be added to extend the brick-cooled region A into the slag zone (mid barrel). Below the brick-cooled region A, the refractory bricks are backed by an insulating safety lining 15.

In the smelter reactor 10, a taphole 26 was located at approximately the fifteen metric ton (mt) metal line. Casting was conducted approximately every 90 to 120 minutes. Metal 12 and slag 14 samples were taken at cast by the use of a sub-lance (not shown). The offgas 28 exiting the smelter reactor 10 was analyzed by two Perkin-Elmer mass spectrometers. The samples of offgas 28 were obtained from a duct prior to entry into the cyclone 40 as well as from locations just after the cyclone 40. The offgas 28 was continuously monitored for CO, $CO_2$, $H_2$, $H_2O$, $N_2$, and Ar. A gas chromatography unit was used to measure the levels of sulfur bearing gases such as $H_2S$, COS, $SO_2$, and $CS_2$.

As recited previously, the offgas 28 exiting the smelter 10 is dust-laden as it exits smelter reactor 10. The nitrogen 24 and oxygen 22 blown into reactor 10 assist in the creation of the dust-laden offgas 28. As can be seen in FIG. 2, prior to cyclone 40, smelter offgas 28 is preferably tempered by a controlled amount of cold recycle gas 49. The now mixed offgas stream 32 then passes to cyclone 40. As the tempered offgas 32 passes through the cyclone 40, some of the dust, which is primarily carbonaceous and ferrous content is removed as cyclone catch, or dust 42. The relatively cleaner gas exiting the cyclone 40 was split into two streams. These streams were quenched separately, by scrubbers 46 and 48 with one stream being used for tempering the gas entering the cyclone 40. The generated sludge 50 from the scrubbers 46 and 48 was sampled regularly. The cleansed offgas 54 was subsequently burnt in a flare stack.

Various sources of waste oxides 18 were charged to the smelter reactor 10. The steel plant waste oxides 18 smelted in the following examples were BF dust and sludge, BOF dust and sludge, and RM sludge. The composition of the various agglomerated waste oxides 18 used in the pilot plant trials is shown below in table 1.

TABLE 1

Composition of Agglomerated Waste Oxides (Wt. %)

| Agglomerate | BF Dust | BF Sludge | BOF Dust | BOF Sludge | Rolling Mill Sludge | Zinc Calcine | Zn Level (%) |
|---|---|---|---|---|---|---|---|
| A  | 40   | 40   | 20 | 0  | 0  | 0  | 0.67  |
| B  | 40   | 20   | 20 | 0  | 20 | 0  | 0.70  |
| C  | 22.5 | 22.5 | 20 | 35 | 0  | 0  | 0.81  |
| D1 | 25   | 25   | 50 | 0  | 0  | 0  | 1.27  |
| D2 | 25   | 25   | 50 | 0  | 0  | 0  | 3.48  |
| E1 | 0    | 0    | 70 | 0  | 0  | 30 | 21.09 |
| E2 | 15   | 15   | 30 | 0  | 0  | 40 | 24.56 |

Generally, in integrated steel mills, a mixture of the generated BF/BOF/RM waste oxides 18 has a zinc content of up to approximately 3.5% Zn on a dry weight basis. This is the case in agglomerates A, B, C, D1, and D2, as shown above in Table 1. In electric arc furnace (EAF) based steel plants, the zinc content in the waste can be as much as 25%. In example agglomerates E1 and E2, the zinc level of EAF plant wastes is simulated by using zinc calcine. In some trials, dry BF and BOF dust were directly injected into the slag 14. The chemical composition of the agglomerates smelted is shown below in Table 2.

TABLE 2

Chemistry of Agglomerated and Injected Waste Oxides (Wt. %)

| | Agglomerate | | | | | | | Injected BF Dust | Injected BOF Dust |
|---|---|---|---|---|---|---|---|---|---|
| | A | B | C | D1 | D2 | E1 | E2 | | |
| $SiO_2$ | 7.82 | 6.41 | 5.5 | 6.77 | 5.56 | 3.5 | 4.17 | 6.69 | 1.88 |
| $Al_2O_3$ | 2.11 | 1.99 | 2.37 | 2.2 | 1.32 | 0.92 | 1.05 | 1.66 | 0.27 |
| CaO | 13.63 | 12.78 | 12.18 | 18.84 | 11.73 | 9.22 | 8.87 | 5.23 | 16.88 |
| MgO | 1.25 | 1.47 | 1.35 | 2.4 | 1.74 | 1.39 | 1.4 | 1.44 | 4.61 |
| FeO | 6.18 | 10.49 | 9.42 | 6.92 | 7.27 | 5.16 | 5.04 | 7.63 | 6.33 |
| $Fe_2O_3$ | 49.5 | 46.87 | 50.67 | 44.75 | 55.7 | 50.46 | 39.98 | 45.37 | 58.82 |
| Fe metallic | 1.42 | 0.89 | 1.21 | 1.38 | 1.1 | 0.79 | 0.5 | 1.03 | 1.21 |
| $Na_2O$ | 0.13 | 0.19 | 0.27 | 0.024 | 0.1 | 1.11 | 0.227 | | 0.03 |
| $K_2O$ | 0.53 | 0.58 | 0.46 | 0.13 | 0.23 | 0.33 | 0.281 | | 0.02 |
| ZnO | 0.83 | 0.87 | 1.01 | 1.58 | 4.33 | 26.85 | 30.57 | | 6.56 |
| PbO | 0.079 | 0.062 | 0.11 | 0.029 | 0.023 | 0.036 | 0.029 | | |
| C | 15.87 | 16.19 | 12.57 | 10.31 | 9.61 | 1.79 | 6.93 | 27.3 | 2.63 |
| S | 0.45 | 0.43 | 0.34 | 0.41 | 0.31 | 0.75 | 1.01 | 0.35 | 0.07 |
| Cl | 0.3 | | 0.23 | | 0.14 | 0.2 | 0.2 | | |
| F | 0.25 | | 0.25 | | 0.35 | 0.088 | 0.15 | | |
| Total Fe | 40.88 | 41.85 | 44.01 | 38.09 | 45.74 | 40.13 | 32.41 | 38.72 | 47.31 |
| Total Gangue | 24.81 | 22.65 | 21.40 | 30.21 | 20.35 | 15.03 | 15.49 | 15.02 | 23.64 |

With reference to FIGS. 1 and 2, a typical run will now be described. Initially, a run began with the charging of about 13 mt of hot metal 12, melted overnight in an induction furnace (not shown), into the smelter 10. Thereafter, oxygen 22 was blown into the smelter 10, wherein the smelting operation continued until the trial objectives were met. Smelter operation during a trial typically lasted for about 12 hours. The first hour was used for making slag 14, while the next two hours involved the smelting of hematite pellets. By this time, the offgas 28 was sufficiently heated to allow the input of waste oxides 18 containing zinc, lead, alkalis, and halogens such that their deposition in offgas ducts and cyclone 40 did not occur. When the addition of waste oxides 18 was terminated, smelter operation was continued with hematite pellets and a "finishing practice" was adopted. The reactor vessel 10 was drained and allowed to cool before inspection.

Stable operation of the smelter 10 can be achieved by use of the procedures described in copending U.S. patent application by Sarma et al. entitled "Method for Stable Operation of a Smelter Reactor," filed contemporaneously herewith and incorporated herein by reference. In a typical run, stable operation was in part maintained by controlling the raw material addition rate, i.e., the rate of the iron oxide 16 addition and the rate of waste oxide 18 addition. The material addition rates were adjusted using energy and materials balances for control of the temperature of hot metal 12 and the FeO % (dry weight basis) of slag 14. The typical blowing rate of oxygen 22, after the start-up period, was about 5500 Nm$^3$/h. The target temperature of hot metal 12 was in the range of about 1475° C. to about 1575° C., while the FeO % of slag 14 was controlled to remain at or below about 6%.

Microscopic as well as chemical analysis of the cyclone dust 42 and smelter sludge 50 have been conducted to determine the mechanism of dust formation. The following observations and conclusions are based on results of actual trials.

The amount of cyclone dust 42 increases significantly with increasing volatile matter content of the carbonaceous fuel 20. The increase is primarily due to additional carbon losses. The carbon losses can not be explained by the entrainment of fines alone. It is known that, during coal de-volatization, fragmentation of coal particles can occur. This will result in the production of additional fines that may be carried out of the smelter 10. In addition, carbon from any unburned volatiles may be carried out as soot. During operation with coke breeze, about 50% of the cyclone dust 42 is in the 6-500 mesh range (3 mm–25 $\mu$m diameter), while the remaining 50% is finer than 500 mesh. The diameters given are average diameters of the respective particles. With medium volatile coal as the fuel source, approximately 90% of the dust is in the 6-500 mesh range, while the remainder is finer than 500 mesh. The increased coarser fraction in the cyclone dust 42 with medium volatile coal is a result of higher amounts of carbon dust. This resulted in the dust carbon content being greater by 75%. Since most of the additional carbon in the dust is in the coarse size range, it can be concluded that carbon dust is primarily generated by the entrainment of fines and fragmentation of coal.

In addition, there is a substantial amount of metallic iron in both the cyclone dust 42 and smelter sludge 50. In the cyclone dust 42, free metallic iron spheres and iron contained within coarser carbon particles have been observed. Microscopic analyses of the cyclone dust 42 and sludge 50 have also shown the presence of micron-sized metallic iron particles, some of which have an outer iron oxide layer. Size analysis of the sludge 50 has shown that it is almost 100% finer than 500 mesh (25 $\mu$m diameter). Finally, the iron-to-carbon ratio in the sludge 50 is generally more than 100 when operating with coke breeze and hematite. The above information suggests that the iron component of the cyclone dust 42 from the smelter 10 primarily comes from vaporization of fuming iron and ejection of metallic iron droplets.

It should be noted that, in smelting processes such as that shown in FIG. 2, the produced sludge 50 is particularly useful to zinc producers (who will pay for zinc-rich sludge) if the zinc-to-iron ratio in the sludge 50 is at least five (weight basis, calculated as elemental Zn and Fe). Thus, in addition to environmental concerns, it is also desirable from an economic standpoint to reduce the amount of iron present in the sludge 50. One approach for achieving the minimum Zn/Fe ratio is to increase the zinc input to the smelter 10. The feasibility of this approach is evident from the data shown in FIG. 3. However, adding too much zinc can adversely affect the production rate of hot metal 17, as well as the fuel and oxygen consumption rates. Consequently, it is preferable to reduce the generation of iron dust, i.e., ferrous content, within smelter 10 to obtain the specified Zn/Fe ratio of sludge 50. Moreover, it is also preferable to charge the minimum required amount of zinc. This approach results in lower fuel and oxygen rates, as well as improves the iron yield. The mechanism of iron dust generation, and the various parameters affecting iron dust generation, will now be discussed.

The amount of iron in the cyclone dust 42 and sludge 50 can be present due to the following reasons: (i) carryover of iron feed charged to the smelter 10 in the offgas 28, (ii) ejection of metal droplets from the smelting reactor 10, and (iii) vaporization of iron from the smelter 10 and its subsequent condensation and possible oxidation from cooling offgas 28. The mechanism for the generation of iron dust was investigated by microscopy studies and chemical analysis. The size distribution of the dust in the sludge 50 was also investigated.

The mineralogy and textures of the cyclone dust 42 and smelter sludge 50 were studied by reflected light, transmitted light, and cathodoluminescence microscopy, while the phase compositions were determined by scanning electron microscopy techniques. In the cyclone dust 42, free metallic iron spheres and iron contained within coarser carbon particles were observed. Iron spheres contained in the carbon particles were twice as abundant as those found as free iron particles. Photomicrographs of the cyclone dust 42 show the presence of coke breeze, petroleum coke, slag, metallic iron spheres, and iron oxide. Metallic iron droplets with an outer layer of iron oxide were also visible. The cyclone dust 42 consisted mainly of carbon (>75 wt. %) when operating with coal and hematite pellets. With coke breeze as the fuel source 20, the amount of cyclone dust 42 decreased substantially, due to a decrease in the amount of carbon. During operation with coke breeze, about 50% of the cyclone dust was in the 6-500 mesh size range (3 mm to 25 $\mu$m), while the remaining 50% was less than 500 mesh. With medium volatile coal as the fuel source 20, about 10% of the cyclone dust 42 was finer than 25 $\mu$m, while the remainder was in the 3 mm to 25 $\mu$m range.

Figure 4:
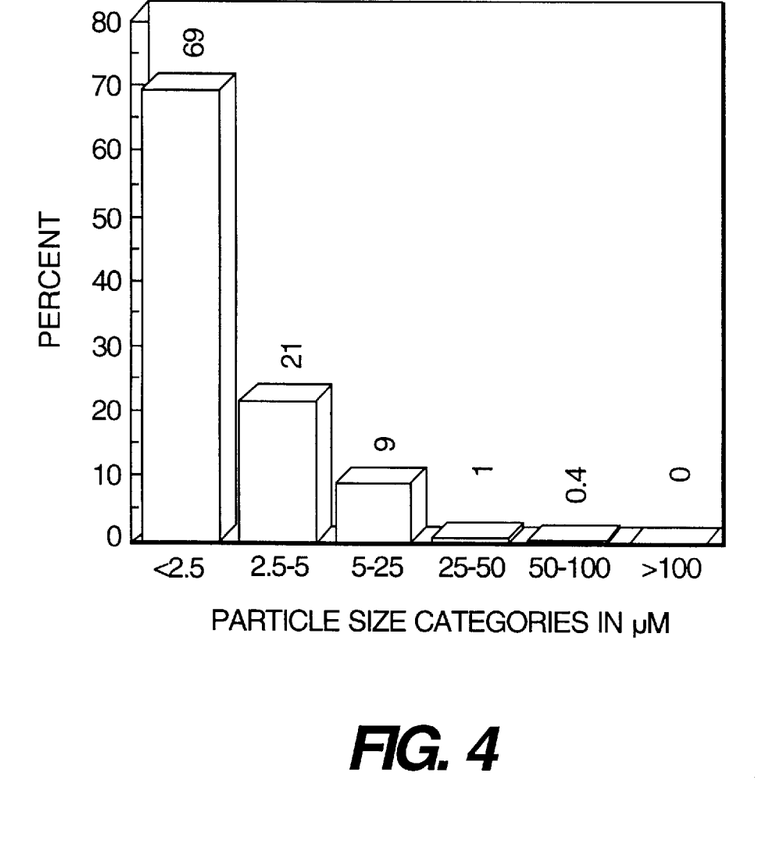
FIG. 4 is a graph illustrating the particle size distribution in the sludge.

Microscopic studies of the smelter sludge 50 revealed that it contains large amounts of fine, metallic iron. Photomicrographs of the smelter sludge 50 show an abundance of metallic iron spheres present as a cluster. When operating with coke breeze and hematite pellets, the iron-to-carbon ratio in the sludge was generally greater than 100. The sludge consisted of very fine particles and wet screen analysis showed that the sludge particles were generally finer than 25 $\mu$m. Size analysis, using particle counting methods, showed that the mean particle size was in the 2 $\mu$m to 7 $\mu$m range. FIG. 4 (from UMR) illustrates the particle size distribution based on a count of 500 particles in the sludge 50. About 90% of the particles were finer than 5 $\mu$m and virtually all the sludge particles were finer than 100 $\mu$m.

Calculations to determine the size of the particles that would be carried out of smelter 10 were conducted. The calculations assumed that the particles were perfect spheres and that there is no interaction between particles. At the pilot plant, the gas velocity for operation with coke breeze was about 3 m/s. Using these assumptions, the largest iron particle that could be carried away by the gas was thus estimated to be about 400 µm.

Based on the above information, the following conclusions can be drawn with respect to the mechanism of iron dust, i.e., ferrous content generation. The extensive presence of metallic iron in the sludge 50 indicates that the carryover of iron ore is not a factor in iron dust generation. The post-combustion degree of the gas when operating with coke breeze was mostly in the 50% to 55% range. Consequently, this gas does not have the capability to reduce hematite to metallic iron in the offgas duct even if kinetic limitations were not a barrier. Further, when blast furnace dust (2.5 tonnes per hour) and BOF dust (2 tph), both of which are much finer materials than hematite pellets, were injected into the slag 14, the amount of iron in the sludge 50 did not increase. This information implies that the carryover of the iron-bearing feed 16 is a marginal contributor to the generation of iron dust. Thus, iron dust is most likely generated from the ejection of metal droplets or the fuming of iron.

Considering that most of the metallic iron present in the sludge 50 is less than 5 µm (although droplets as large as 400 µm could have been present) and the iron-to-carbon ratio in the sludge 50 when operating with coke breeze and hematite pellets was always greater than 100, ejection of iron droplets is apparently not the predominant mechanism of dust formation. Finally, as will be shown later, the amount of iron in the sludge 50 is dependent on lance gap, slag weight/cross-sectional area, and the temperature of hot metal 12. This would not be the case if ejection of iron droplets was the main contributing factor. Thus, it can be concluded that vaporization of iron is the predominant mechanism of iron dust, i.e., ferrous content, generation.

The mechanism involved in the generation of iron dust is believed to be as follows. Evaporation of iron occurs at the superheated spot (estimated temperature=about 1740° C. to about 2100° C.), where gaseous oxygen 22 contacts hot metal 12. The iron vapor is carried away by the offgas 28. As the offgas 28 cools, the offgas 28 is supersaturated with iron vapor. Consequently, droplets of iron are formed. The computed size of the iron dust particles, assuming vaporization of iron to be the mechanism for iron dust generation, was found to be in agreement with that measured in the dust samples.

Calculation based on observations from the operation of a basic Bessemer converter shows that the nucleation size of particles generated in this manner would be in the sub-micron range, which is consistent with the case for some of the iron particles in the smelter sludge 50. Thus, these particles may not have had an opportunity to grow. Clusters of sub-micron sized iron droplets were observed in the sludge 50. The clusters may be the result of several droplets forming in a local area, due to the supersaturation of iron vapor in the gas bubble as it cooled. It is possible that some of these particles might grow during gas cooling by acting as nucleation sites for the deposition of additional iron droplets. This may explain the presence of some larger-than-micron size metallic iron droplets in the sludge 50.

It is worthwhile to review the blowing practice employed during the trials. Oxygen was blown through a central lance at a flowrate of about 4800 Nm³/h to about 5500 Nm³/h. In most instances, the flowrate was about 5500 Nm³/h. The lance had two separate circuits, a primary, and a secondary. The primary circuit had 4 nozzles (10° straight bore) while the secondary circuit had 8 nozzles (4 at 32° and 4 at 36°). The velocity of the primary oxygen jets, at a furnace pressure of about 0.7 kg/cm² gauge and a flowrate of about 2050 Nm³/h, was estimated to be 0.53 Mach. The metal bath 12 at the bottom of the vessel was stirred by nitrogen gas 24 blown in from three tuyeres at a total flowrate of about 450 Nm³/h.

Figure 5A:
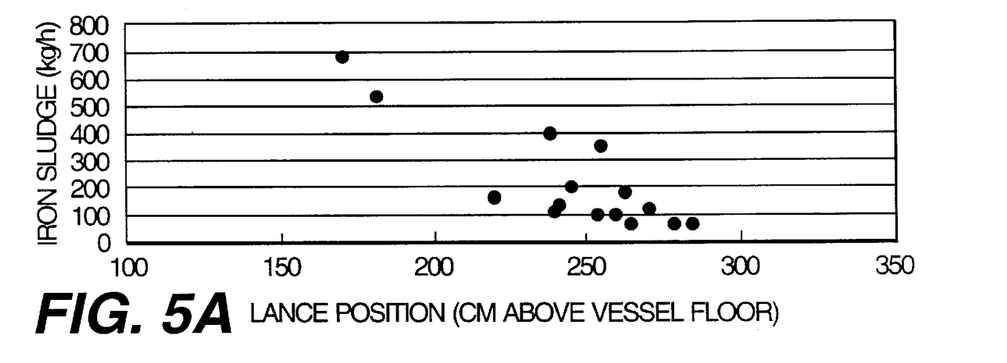
FIG. 5(a) is a graph illustrating relationship between the lance position above the reactor floor and the iron sludge production rate.

A typical trial started with the charging of about 13 tonnes of metal 12 into the smelting reactor 10. After the system was sealed, oxygen blowing continued until the trial ended. The initial hours of the trial were used for slagmaking. During this period, the weight of slag 14 in the smelter 10 increased to about 4 tonnes by the addition of a blend of blast furnace dust and BOF slag. A low lance position was maintained for the initial 30 minutes or so of oxygen blowing. FIG. 5(a) illustrates the amount of iron in the sludge 50 when operating at low slag volume (less than 3.6 tonnes). This mode of operation is representative of the start-up practice, or the situation following a heavy slag cast.

Figure 5B:
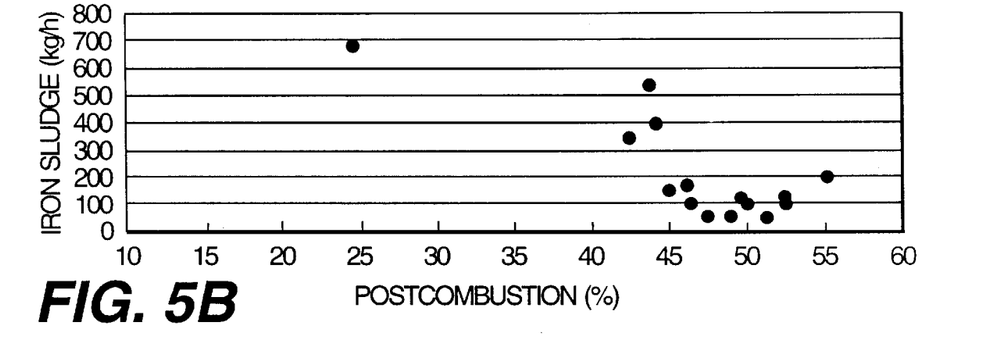
FIG. 5(b) is a graph illustrating relationship between the post-combustion degree and the iron sludge production rate.
Figure 5C:
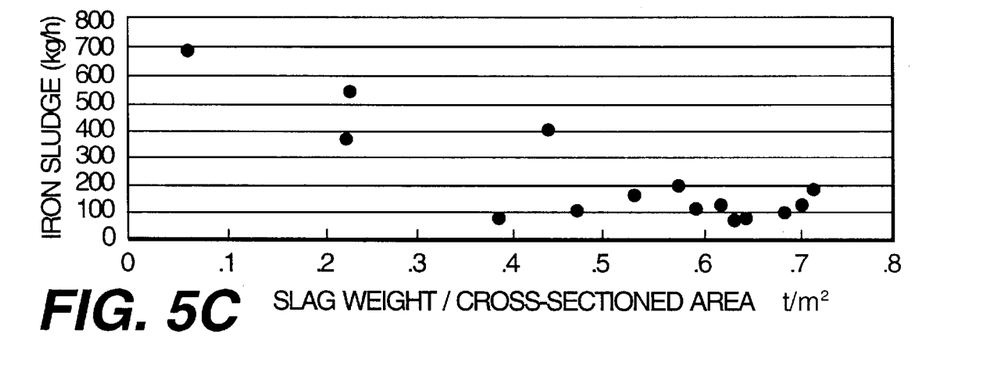
FIG. 5(c) is a graph illustrating the relationship between the slag weight and the iron sludge production rate.
Figure 7A:
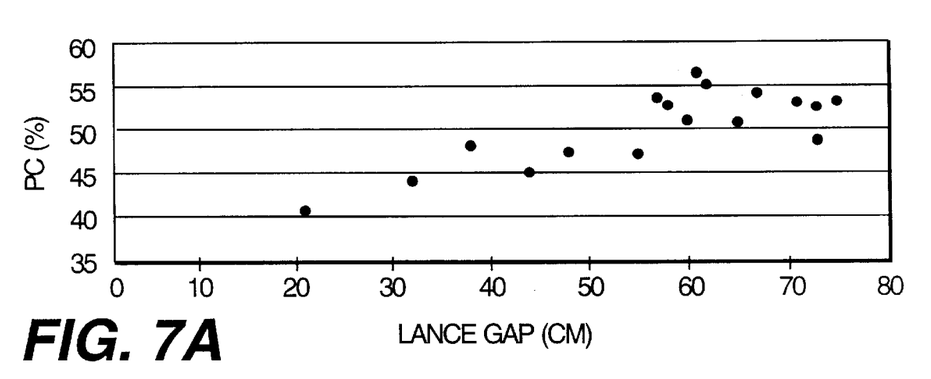
FIG. 7(a) is graph illustrating the relationship between the lance gap and the post-combustion degree.
Figure 7B:
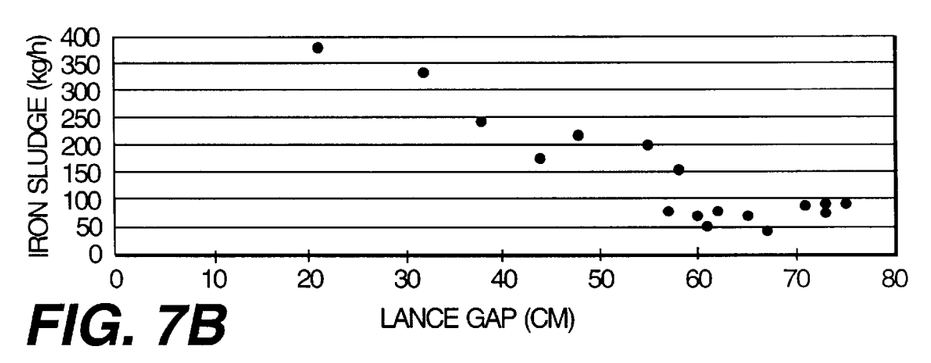
FIG. 7(b) is a graph illustrating the relationship between the lance gap and the iron sludge production rate.
Figure 7C:
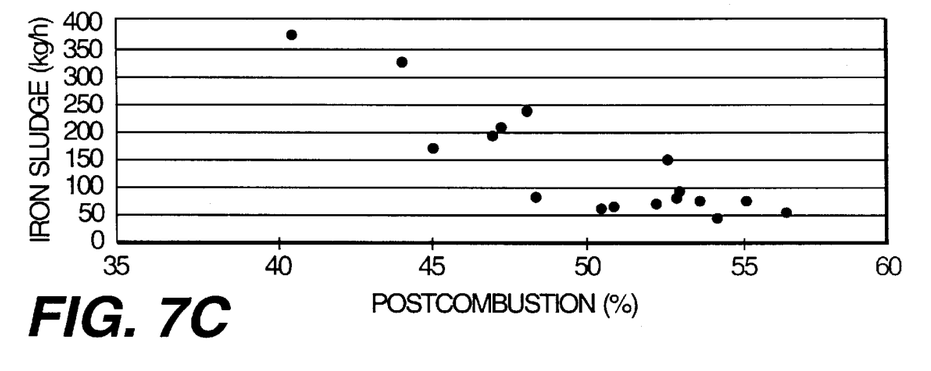
FIG. 7(c) is a graph illustrating the relationship between the iron sludge production rate and post-combustion degree.

The effect of the lance gap, i.e., the distance between the lowermost oxygen outlet of the overhead lance and the pseudo-top surface of the slag layer 14, on the amount of iron in the sludge 50 is evident from FIG. 7(b). At lower lance heights, the amount of iron in the sludge 50 was higher with other parameters remaining constant. The effect of the weight of slag/cross-sectional area on the amount of iron in the sludge 50 is depicted in FIG. 5(c). It can be seen that, with other parameters being the same, a higher weight of slag/cross-sectional area results in a lower amount of iron sludge. Generally, a higher slag weight/cross-sectional area results in a lower ferrous content in the offgas 28, assuming constant lance gap and hot metal temperature. The scatter in the data is caused by differences in the char weight, which affects the extent of slag foaming, and the operating temperature.

The post-combustion degree (PCD) of the offgas, measured in the duct, is also related to amount of iron in the sludge 50. This relationship can be used during operation to maintain the amount of iron in the sludge 50 below a certain level. (See FIG. 5(b)).

Figure 6A:
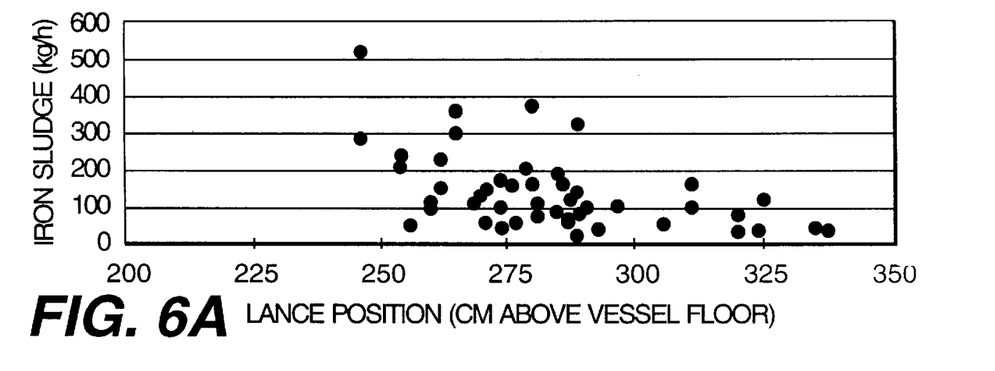
FIG. 6(a) is a graph illustrating the relationship between lance position above the reactor floor and the iron sludge production rate.
Figure 6B:
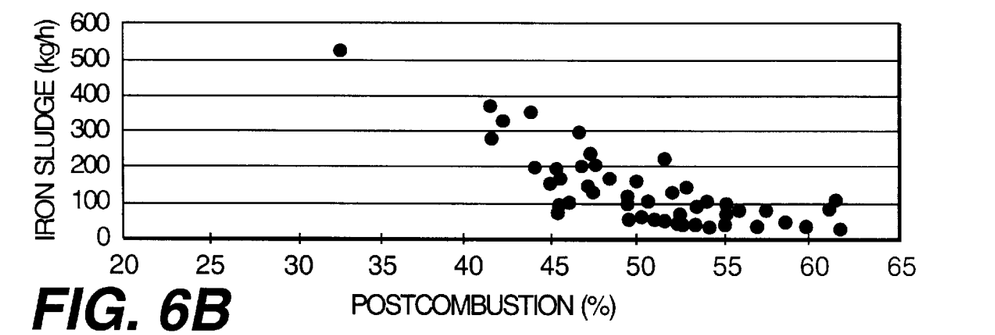
FIG. 6(b) is a graph illustrating relationship between the post-combustion degree and the iron sludge production rate.
Figure 6C:
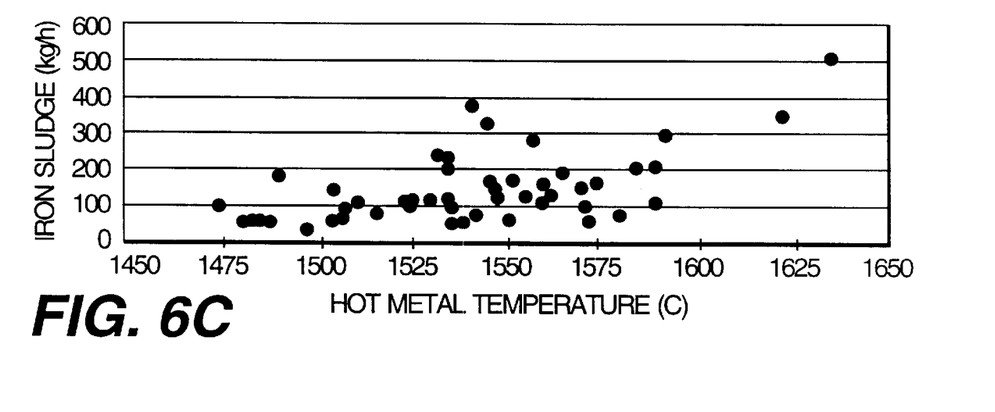
FIG. 6(c) is a graph illustrating the relationship between metal temperature and the iron sludge production rate.

FIG. 6 shows the relationship between the amount of iron sludge produced, i.e., ferrous content in offgas 28, and the lance position. FIG. 6(b) shows the relationship between the PCD and the amount of iron sludge produced with a slag weight/cross-sectional area within the range of about 0.8 t/m² to about 2.0 t/m². Similarly, FIG. 6(c) shows the relationship between the temperature of hot metal 12 and the amount of iron sludge produced for operation with a ratio of slag weight to cross-sectional area within the range of about 0.8 t/m² to about 2.0 t/m². Again, the scatter in the data is a result of varying char weight, slag weight, and temperature. From FIGS. 5 and 6, the following general conclusions can be drawn: Under conditions of constant slag weight/cross-sectional area, char weight, and hot metal temperature, a larger lance gap results in a lower ferrous content in the offgas 28 and, consequently, a lower quantity of iron in the sludge 50. The inverse relationship between PCD and ferrous content is evident and can be used to control the amount of iron in sludge 50.

In addition, a higher temperature of hot metal 12 leads to higher iron sludge production rates at constant slag weight/cross-sectional area, lance gap, and char weight. The amount of iron in the sludge 50 is directly related to the temperature of the hot metal 12. Applicants have found an increase in the amount of iron sludge 50 produced at temperatures exceeding about 1535° C. Since approximately 1535° C. is the melting point of iron, this is consistent with the theory that vaporization of the metal 12 is the significant cause of iron dust generation. This is because neither the ejection of iron droplets nor the carryover of the iron-bearing feed is a temperature-dependent process. This provides additional credence to the hypothesis that vaporization of iron is the main contributing factor for iron dust generation in the smelting process.

During the waste oxide recycling trials, the foam height or height of slag 14 was measured by a conductivity probe attached to a sub-lance. This enabled Applicants to determine the lance gap. A positive lance gap means that the lance tip was positioned above the upper level of the slag layer 14. The location of that level is determined using a conductivity probe attached to the sub-lance (not shown). As can be seen from FIG. 7(b), the amount of iron in the sludge 50, i.e., the ferrous content, is inversely related to the lance gap. On the other hand, as seen in FIG. 7(a), the PCD was directly related to the lance gap.

In addition, the weight of slag/cross-sectional area plays an important role in iron dust generation. Adequate slag cover is necessary to shield the hot metal 12 from the oxygen jets and reduce iron fuming. For example, high levels of iron dust are generated during the slagmaking period and after a heavy slag cast.

The amount of iron reporting to the sludge 50 can be reduced if a high efficiency cyclone 40 (with respect to iron removal) is present before the scrubbers 46 and 48. As stated earlier, almost all the sludge 50 is finer than 500 mesh (25 $\mu$m average diameter) and the cyclone efficiency for the capture of iron is about 50% when the iron dust generation rate is less than 200 kg/h. This resulted in about half the iron dust from the smelter 10 reporting to the sludge 50.

In order to minimize iron dust generation, it is preferable to maintain adequate slag cover and lance gap, as well as avoid high temperature deviations. In the present example, during non-start-up operations, the minimum weight of slag/cross-sectional area, for this purpose, is determined to be about 0.8 t/m². In addition, a lance gap within the range of about 40 cm to about 80 cm is preferable to keep the iron content in the sludge 50 below 100 kg/h. This lance gap is consistent with the most preferred PCD of about 50 to 55% when operating with coke breeze and about 35 to 40% when operating with medium volatile coal. Under these operating conditions, it is possible to control the amount of iron in the sludge 50 to below 100 kg/h.

Figure 3:
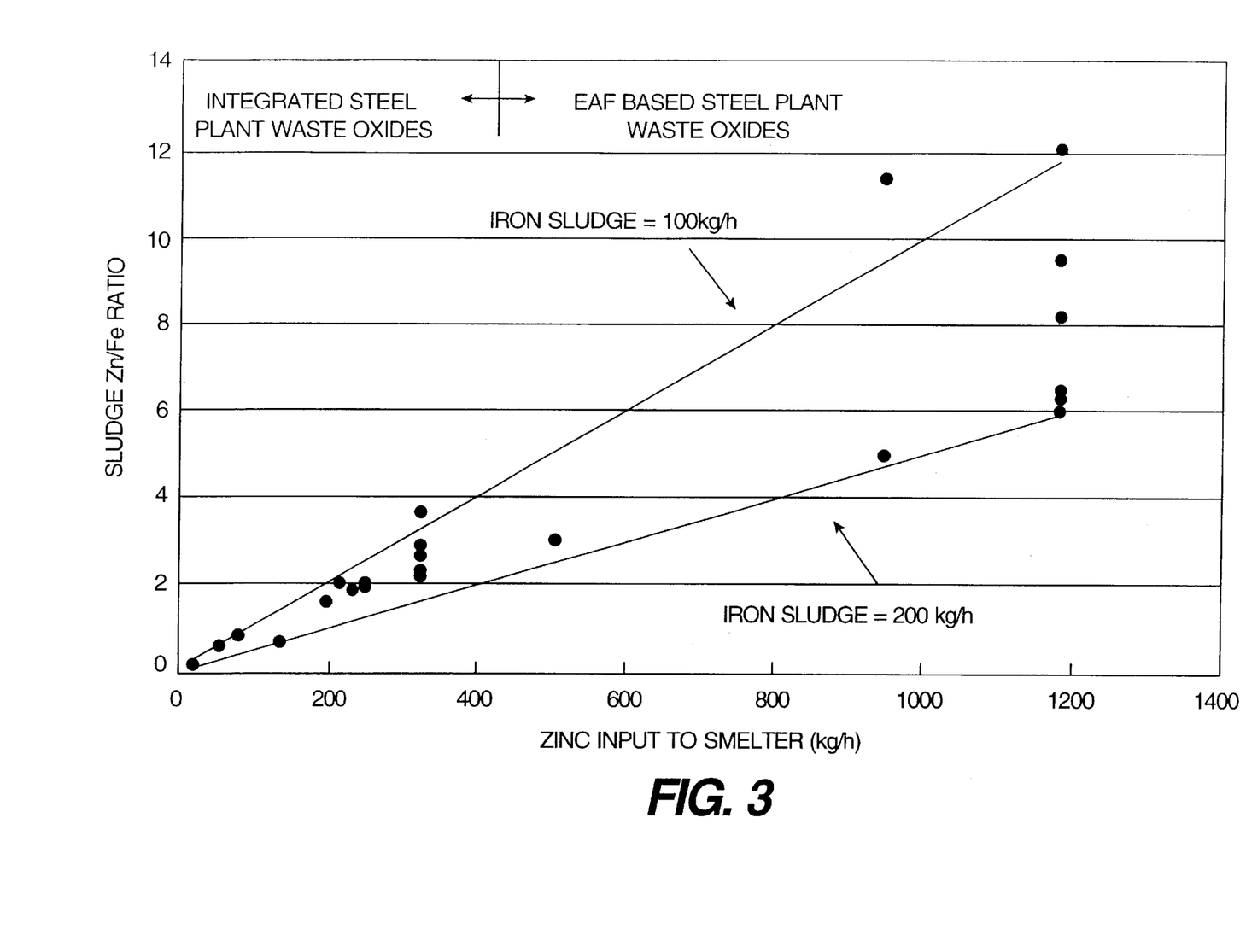
FIG. 3 is a graph illustrating the ratio of zinc-to-iron in the sludge on a dry weight basis as a function of total amount of zinc input to the smelter.

To obtain the minimum zinc-to-iron weight ratio of about five, it is preferable to control the amount of iron in the sludge 50, as well as charge an adequate amount of zinc to the smelter 10. FIG. 3 shows the zinc-to-iron weight ratios in the sludge 50 as a function of zinc input to smelter 10. As can be seen, zinc-to-iron ratios in excess of five were achieved when operating with a high zinc input, as in the case of the synthetic EAF dust agglomerates. For operations with agglomerated waste oxides 18 from integrated steel plants, the zinc-to-iron weight ratio in the sludge 50 is less than four. Consequently, to obtain zinc-to-iron weight ratios in excess of five with integrated steel plant waste oxides 18, two options are available. The integrated steel plant waste oxides 18 can be blended with EAF dust to obtain the desired zinc-to-iron weight ratio in the sludge 50. Alternatively, the smelter sludge 50 generated during operation with the integrated steel plant waste oxides 18 can be recycled to increase the zinc load to the smelter 10 to obtain the desired zinc-to-iron weight ratio.

In summary, the vaporization of iron is the primary cause of iron dust, or ferrous content generation in the smelting process. The amount of iron sludge is dependent on the lance gap, the slag weight/cross-sectional area, and hot metal temperature. Generally, increasing the slag cover and lance gap decreases the ferrous content. In addition, a lower temperature of hot metal 12 tends to generally reduce the ferrous content of sludge 50. Also, the inverse relationship between the PCD and the amount of iron present in the sludge 50 can be used in actual operation to control the ferrous content. The amount of iron sludge produced is advantageously less than 200 kg/h. In this situation, the PCD for operation with coke breeze will usually be above 45%.

The lance gap can be adjusted following a slag height measurement, which is preferably done at least once every 15 or 30 minutes. Alternatively, the PCD can be considered an indicator of the amount of iron sludge and be used to guide the lance position. This can result in PCD levels in excess of 50%, with the amount of iron sludge being less than 100 kg/h, or about 2% or less of the iron feed.

What is claimed is:

1. In a process of smelting iron that comprises the steps of:
   a) introducing a source of iron oxide, oxygen, nitrogen, and a source of carbonaceous fuel to a smelting reactor, at least some of said oxygen being continuously introduced through an overhead lance;
   b) maintaining conditions in said reactor to cause (i) at least some of the iron oxide to be chemically reduced, (ii) a bath of molten iron to be created and stirred in the bottom of the reactor, surmounted by a layer of slag, and (iii) carbon monoxide gas to rise through the slag;
   c) causing at least some of said carbon monoxide to react in the reactor with the incoming oxygen, thereby generating heat for reactions taking place in the reactor; and
   d) releasing from the reactor an offgas effluent, the improvement wherein, after start-up of the process is complete, said steps (a) and (b) are controlled so as to:
   e) keep the temperature of the molten iron at or below about 1550° C.,
   f) keep the slag weight at or above about 0.8 tonne per square meter, and g) keep the FeO content of the slag within the range of about 2 to 5 weight percent.

2. A process according to claim 1, wherein, after start-up of the process is complete, said steps (a) and (b) are controlled so as to keep the temperature of the molten iron at or below about 1535° C.

3. A process according to claim 1, wherein, after start-up of the process is complete, said steps (a) and (b) are controlled so as to keep the slag weight in the range of about 0.8 to 2 tonnes per square meter.

4. A process according to claim 1, wherein the overhead oxygen lance has a lowermost oxygen outlet and, after start-up of the process is complete, and for substantially the entire time that step (a) is being performed, the distance between said lowermost oxygen outlet and the upper level of the slag layer is held to within the range of approximately 40 to 80 centimeters.

5. A process according to claim 3, wherein the overhead oxygen lance has a lowermost oxygen outlet and, after start-up of the process is complete, and for substantially the entire time that step (a) is being performed, the distance between said lowermost oxygen outlet and the upper level of the slag layer is held to within the range of approximately 40 to 80 centimeters.

6. A process according to claim 1, wherein the total ferrous content of the offgas released during the process (calculated as elemental iron) is at or below about five percent, based on the weight of the total ferrous content of the materials introduced to the reactor (also calculated as elemental iron).

7. A process according to claim 3, wherein the total ferrous content of the offgas released during the process (calculated as elemental iron) is at or below about five percent, based on the weight of the total ferrous content of the materials introduced to the reactor (also calculated as elemental iron).

8. On a process of smelting iron that comprises the steps of:
   a) introducing a source of iron oxide, oxygen, nitrogen, and a source of carbonaceous fuel that is primarily either coal or coke breeze to a smelting reactor, at least some of said oxygen being continuously introduced through an overhead lance;
   b) maintaining conditions in said reactor to cause (i) at least some of the iron oxide to be chemically reduced, (ii) a bath of molten iron to be created and stirred in the bottom of the reactor, surmounted by a layer of slag, and (iii) carbon monoxide gas to rise through the slag;
   c) causing at least some of said carbon monoxide to react in the reactor with the incoming oxygen, thereby generating heat for reactions taking place in the reactor; and
   d) releasing from the reactor an offgas effluent, the improvement wherein, after start-up of the process is complete, said steps (a) and (b) are controlled so as to:
   e) keep the temperature of the molten iron at or below about 1550° C.,
   f) keep the slag weight at or above about 0.8 tonne per square meter, and
   g) keep the post-combustion degree within the range of about 30 to 50% if the majority of the carbonaceous fuel is coal or within the range of about 45 to 60% if the majority of the carbonaceous fuel is coke breeze, said post-combustion degree being calculated according to the equation $$PC = 100 \times \frac{(\%CO_2 + \%H_2O)}{(\%CO + \%CO_2 + \%H_2 + \%H_2O)}.$$

9. A process according to claim 1, wherein, after start-up of the process is complete, the post-combustion degree occurring in the reactor is repeatedly determined and, in response to at least one of said determinations, the position of the overhead oxygen lance, in relation to the upper level of the slag layer, is vertically adjusted to help keep the post-combustion degree within said range.

10. A process according to claim 1, wherein, after start-up is complete, said steps (a) and (b) are controlled so as to also keep the FeO content of the slag within the range of about 2 to 5 weight percent.

11. A process according to claim 9, wherein, after start-up is complete, said steps (a) and (b) are controlled so as to also keep the FeO content of the slag within the range of about 2 to 5 weight percent.

12. A process according to claim 1, wherein, after start-up of the process is complete, said steps (a) and (b) are controlled so as to keep the temperature of the molten iron at or below about 1535° C.

13. A process according to claim 9, wherein, after start-up of the process is complete, said steps (a) and (b) are controlled so as to keep the temperature of the molten iron at or below about 1535° C.

14. A process according to claim 10, wherein, after start-up of the process is complete, said steps (a) and (b) are controlled so as to keep the temperature of the molten iron at or below about 1535° C.

15. A process according to claim 11, wherein, after start-up of the process is complete, said steps (a) and (b) are controlled so as to keep the temperature of the molten iron at or below about 1535° C.

16. A process according to claim 1, wherein, after start-up of the process is complete, said steps (a) and (b) are controlled so as to keep the slag weight in the range of about 0.8 to 2 tonnes per square meter.

17. A process according to claim 1, wherein the overhead oxygen lance has a lowermost oxygen outlet and, after start-up of the process is complete, and for substantially the entire time that step (a) is being performed, the distance between said lowermost oxygen outlet and the upper level of the slag layer is held to within the range of approximately 40 to 80 centimeters.

18. A process according to claim 1, wherein the total ferrous content of the offgas released during the process (calculated as elemental iron) is at or below about five percent, based on the weight of the total ferrous content of the materials introduced to the reactor (also calculated as elemental iron).

19. In a process of smelting iron that comprises the steps of:
   a) introducing a source of iron oxide, oxygen, nitrogen, and a source of carbonaceous fuel that is primarily coal or coke breeze to a smelting reactor, at least some of said oxygen being continuously introduced through an overhead lance having a lowermost oxygen outlet;
   b) maintaining conditions in said reactor to cause (i) at least some of the iron oxide to be chemically reduced, (ii) a bath of molten iron to be created and stirred in the bottom of the reactor, surmounted by a layer of slag, and (iii) gaseous carbon monoxide and hydrogen to rise through the slag;
   c) causing at least some of said carbon monoxide and hydrogen to react in the reactor with the incoming oxygen, thereby generating heat for reactions taking place in the reactor; and
   d) releasing from the reactor an offgas effluent containing CO, $CO_2$, $H_2$, and $H_2O$,
   the improvement wherein, after start-up of the process is complete, said steps (a) and (b) are controlled so as to:
   e) keep the temperature of the molten iron at or below about 1550° C.;
   f) keep the slag weight in the range of about 0.8 to 2 tonnes per square meter; and
   g) keep the FeO content of the slag within the range of about 2 to 5 weight percent;
   and the content of CO, $CO_2$, $H_2$, and $H_2O$ in the offgas is repeatedly measured and, from said measurements, the degree of post-combustion occurring in the reactor is calculated according to the equation $$PCD = 100 \times \frac{(\%CO_2 + \%H_2O)}{(\%CO + \%CO_2 + \%H_2 + \%H_2O)},$$

wherein the percentages are volume percentages, and, in response to at least one of said calculations, the position of the overhead oxygen lance, in relation to the upper level of the slag layer, is vertically adjusted so as to help keep the post-combustion degree within the range of approximately 30 to 50% if the majority of the carbonaceous fuel (dry weight basis) is coal, or within the range of about 45 to 60% if the majority of the carbonaceous fuel (dry weight basis) is coke breeze, whereby the total ferrous content of the offgas released during the process (calculated as elemental iron) is kept at or below about two percent, based on the weight of the total ferrous content of the materials introduced to the reactor (also calculated as elemental iron).

20. A process according to claim 19, wherein, after start-up of the process is complete, said steps (a) and (b) are controlled so as to keep the temperature of the molten iron at or below about 1535° C.

21. A process according to claim 20, wherein, after start-up of the process is complete, said steps (a) and (b) are controlled so as to keep the temperature of the molten iron at or below about 1535° C.

22. A process according to claim 21, wherein the majority of the carbonaceous fuel introduced in step (a) is coal.

23. A process according to claim 21, wherein a majority of the carbonaceous fuel introduced in step (a) is coke breeze.

24. A process according to claim 22, wherein the degree of post-combustion occurring in the reactor is determined either continuously or at a frequency of at least once every 15 minutes.

25. A process according to claim 24, wherein the degree of post-combustion occurring in the reactor is determined either continuously or at a frequency of at least once every 15 minutes.

26. A process according to claim 2, wherein, during step (a), a source of zinc also is introduced to the reactor, and wherein the zinc-to-iron weight ratio (calculated on an elemental basis) in the offgas is at least 5.

27. A process according to claim 25, wherein, during step (a), a source of zinc also is introduced to the reactor, and wherein the zinc-to-iron weight ratio (calculated on an elemental basis) in the offgas is at least 5.

* * * * *